United States Patent [19]
Schwarzkopf

[11] Patent Number: 5,591,367
[45] Date of Patent: Jan. 7, 1997

[54] ELECTRICAL HEATER ASSEMBLY FOR CYLINDRICAL BODY

[75] Inventor: Eugen Schwarzkopf, Lüdenscheid, Germany

[73] Assignee: Hotset Heizpatronen U. Zubehor GmbH, Ludenscheid, Germany

[21] Appl. No.: 401,409

[22] Filed: Mar. 9, 1995

[30] Foreign Application Priority Data

Mar. 16, 1994 [DE] Germany .................. 44 08 915.5

[51] Int. Cl.$^6$ .................. H05B 3/58; F16L 21/00
[52] U.S. Cl. .................. 219/535; 219/544; 285/390; 285/417
[58] Field of Search .................. 219/535, 469, 219/546, 544, 548; 285/390–393, 417, 21, 289; 138/96 R, 96 T

[56] References Cited

U.S. PATENT DOCUMENTS 4,097,054  6/1978  Derbyshire .................. 279/64
4,382,579  5/1983  Morris .................. 251/214
5,150,922  9/1992  Nakashiba et al. .................. 285/21

FOREIGN PATENT DOCUMENTS 1799522  8/1957  Germany .
3641711  6/1988  Germany .

Primary Examiner—Tu Hoang
Assistant Examiner—Sam Paik
Attorney, Agent, or Firm—Herbert Dubno; Andrew Wilford

[57] ABSTRACT

A heater used on a body having a substantially cylindrical outer surface has a heatable generally cylindrical sleeve fittable over the body and having one end formed with a screwthread and a ring threadable into the screwthread locks the sleeve on the body. More particularly the ring is also formed with a screwthread complementary to the body screwthread and both screwthreads are tapered. This ring is split along its full length so that when the ring is screwed into the body it is compressed radially of a central axis of the body.

6 Claims, 1 Drawing Sheet

ELECTRICAL HEATER ASSEMBLY FOR CYLINDRICAL BODY

FIELD OF THE INVENTION

The present invention relates to an electrical heater assembly for a cylindrical body. More particularly this invention concerns a sleeve heater for an injection-molding nozzle or the like.

BACKGROUND OF THE INVENTION

When a cylindrical body such as an injection-molding nozzle must be heated, it is standard to use a sleeve heater that is slipped over the body and that can be electrically energized to heat the body. The heater typically is formed as a metal sleeve in which is fitted a coil of a resistive-heater element. The inside diameter of the heater is equal to or slightly greater than the outside diameter of the body to be heated.

Such a heater is normally mounted on the body simply by slipping it over the body. When the body subsequently heats up and swells, the heater is solidly locked in place. This means that prior to installation and, in fact, whenever the heater is not activated to swell the body, the two parts can easily slip apart.

OBJECTS OF THE INVENTION

It is therefore an object of the present invention to provide an improved sleeve heater for a cylindrical body.

Another object is the provision of such an improved sleeve heater for a cylindrical body which overcomes the above-given disadvantages, that is which can be secured solidly to the body even without heating the body.

SUMMARY OF THE INVENTION

A heater used on a body having a substantially cylindrical outer surface has according to the invention a heatable generally cylindrical sleeve fittable over the body and having one end formed with a screwthread and a ring threadable into the screwthread locks the sleeve on the body. More particularly the ring is also formed with a screwthread complementary to the body screwthread and both screwthreads are tapered. This ring is split along its full length so that when the ring is screwed into the body it is compressed radially of a central axis of the body.

Thus the heater can be locked to the body prior to installation, making it particularly easy to handle the body. Furthermore when the heater or body needs to be replaced, it is a simple matter to unscrew the ring and separate the parts.

According to the invention the ring is formed with a radially projecting collar provided with surface texturing. This makes it particularly easy to handle and use, although it is within the scope of the invention to make the locking ring of the same outside diameter as the heater sleeve when the entire assembly must be fitted into a hole or the like.

BRIEF DESCRIPTION OF THE DRAWING

The above and other objects, features, and advantages will become more readily apparent from the following description, reference being made to the accompanying drawing in which.

SPECIFIC DESCRIPTION

Figures 1, 2:
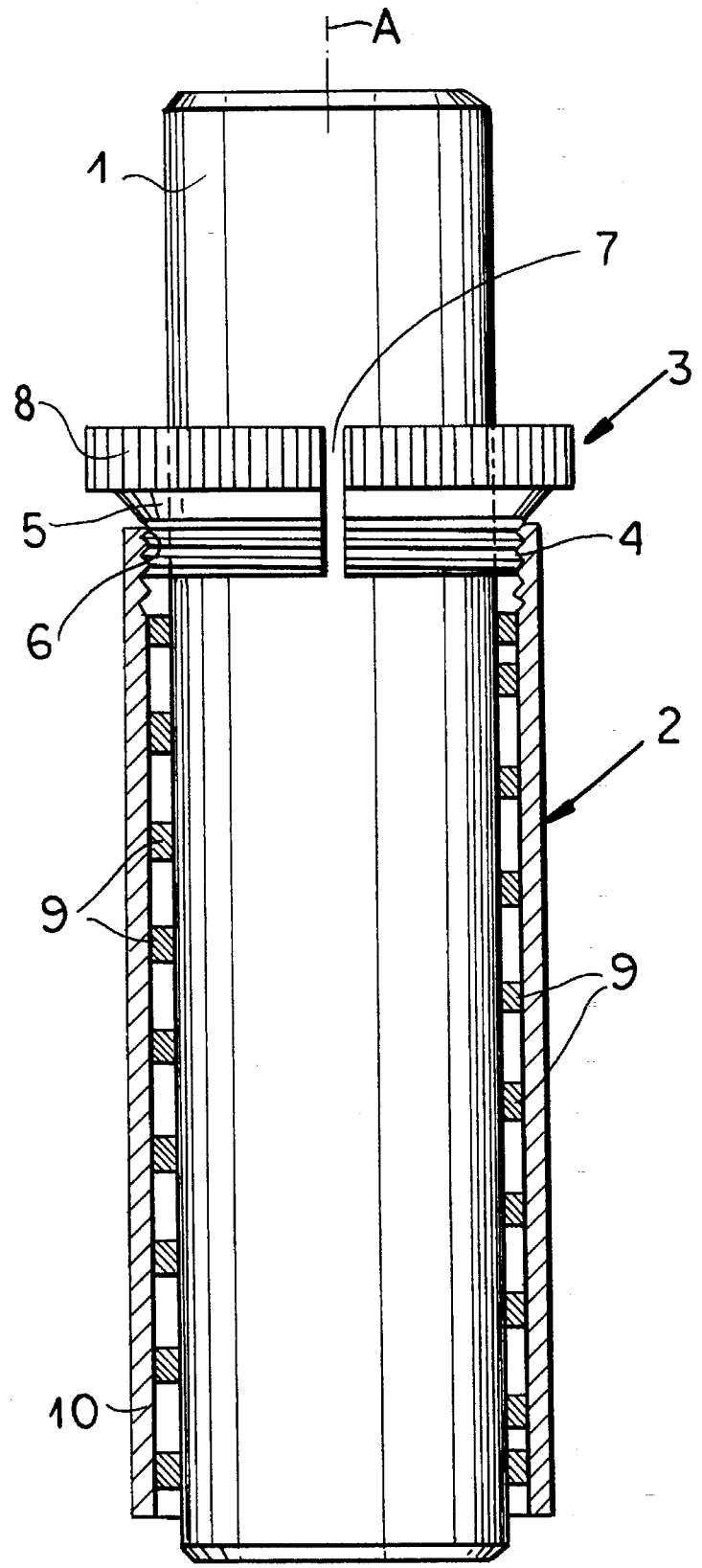
FIG. 1 is an axial section through the assembly according to the invention.
FIG. 2 is a large-scale view of a detail of FIG. 1.

As seen in FIG. 1 a cylindrical body 1 centered on an axis A, here an injection-molding nozzle, is provided with an electrical sleeve heater 2 secured in place by a clamping device 3.

The heater 2 is formed by a stiff cylindrical steel sleeve 10 provided on its cylindrical inside surface with a resistive-heating coil 9 whose inner surface lies against the cylindrical outer surface of the body 1. When an electrical current is passed through the helical coil 9 it heats the body 1 in the manner well known in the art. The upper end of the sleeve 10 is formed as best seen in FIG. 2 with a frustoconical and outwardly flared screwthread 4.

The clamping device 3 comprises a ring 5 formed with an axially throughgoing split 7, which here is straight and parallel to the axis A but which could also be at an angle thereto, and having a small-diameter lower end formed with a frustoconical screwthread 6 complementary to the screwthread 4. The ring 5 has a large-diameter upper end 8 that is knurled or milled and that is readily gripped for rotating the ring 5 relative to the body 1 and heater 2.

When at rest or not installed, the ring 5 has an inside diameter that is slightly greater than an outside diameter of the body 1. As the screwthread 6 is turned down in the screwthread 4, however, this inside diameter decreases to clamp the ring 5 on the body 1, with concomitant reduction of the angular dimension of the split 7. Thus when threaded tightly in place the ring 5 tightly axially fixes the heater 2 on the body 1.

I claim:

1. In combination with a body having a substantially cylindrical outer surface, a heater comprising:

a heatable generally cylindrical sleeve fittable over the body, having a substantially cylindrical inner surface of a diameter generally equal to an outside diameter of the body, and having one end formed with a screwthread; and means including a ring threadable into the screwthread and engageable with the body for locking the sleeve on the body.

2. The heater defined in claim 1 wherein the ring is also formed with a screwthread complementary to the body screwthread and both screwthreads are tapered.

3. The heater defined in claim 2 wherein the ring is split along its full length, whereby when the ring is screwed into the body it is compressed radially of a central axis of the body.

4. The heater defined in claim 2 wherein the ring is formed with a radially projecting collar provided with surface texturing.

5. The heater defined in claim i wherein the heater sleeve comprises a cylindrical tube having an inside diameter substantially greater than the outside diameter of the body, and a helical resistive heating element inside the tube and of an inside diameter equal substantially to the outside diameter of the body.

6. In combination with an injection-molding nozzle body having a substantially cylindrical outer surface and centered on an axis, a heater comprising:

a heatable generally cylindrical sleeve fittable over the body and having one end formed with an axially outwardly flared screwthread;

a helical resistive coil inside the sleeve externally outwardly engaging the sleeve and internally inwardly engaging the body outer surface; and a split ring formed with a tapered screwthread generally complementary to the sleeve screwthread and threadable into the screwthread, the ring having an inside diameter that is somewhat greater than an outside diameter of the body when it is not screwed into the sleeve and an inside diameter that is the same as the outside diameter of the body when it is screwed into the sleeve, the ring inwardly bearing on the body when threaded into the sleeve.

* * * * *